May 3, 1955 C. C. FISH 2,707,320
METHOD OF MAKING VEHICLE BODY DOORS
Filed June 25, 1951 3 Sheets-Sheet 2
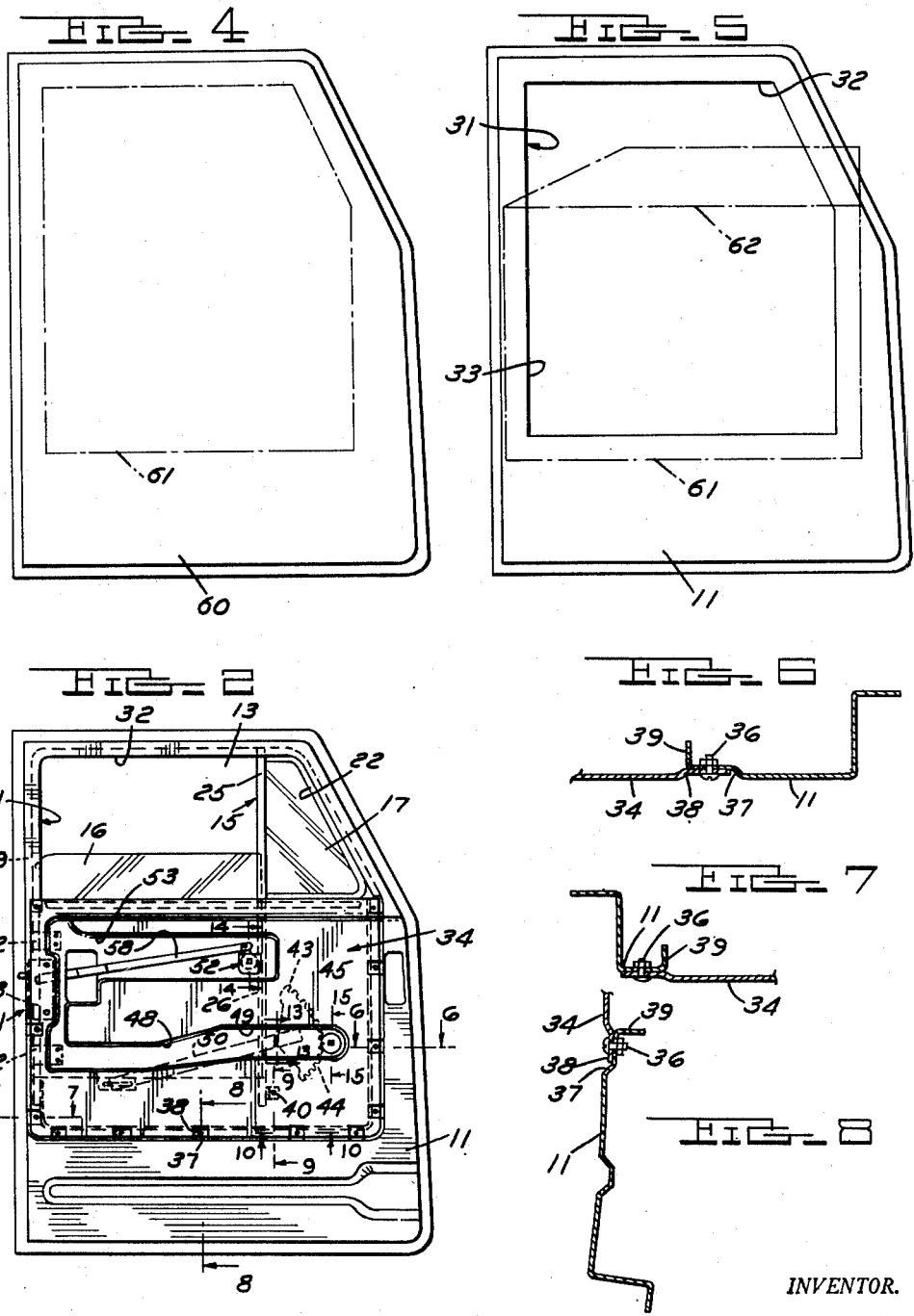
INVENTOR.
CARL C. FISH
BY
ATTORNEYS May 3, 1955
C. C. FISH
2,707,320
METHOD OF MAKING VEHICLE BODY DOORS
Filed June 25, 1951
3 Sheets-Sheet 3
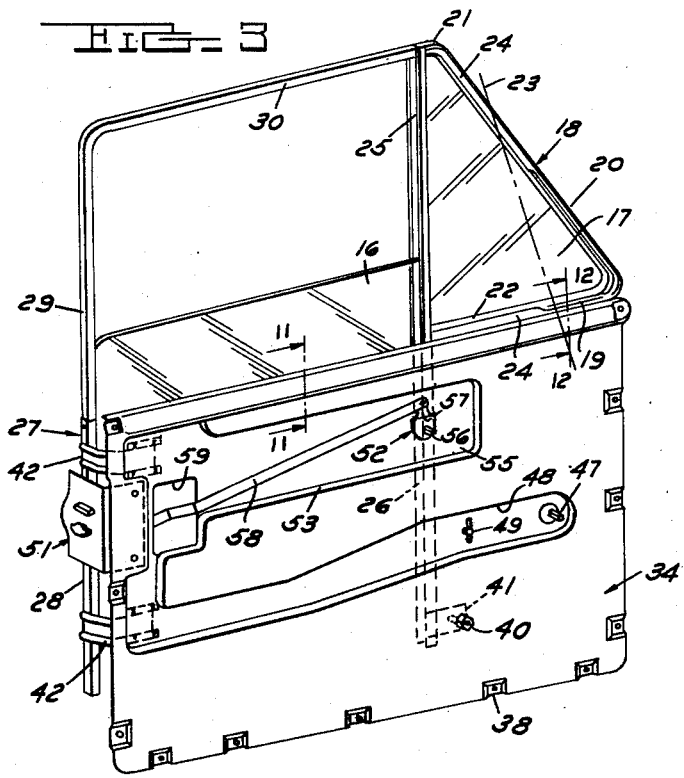
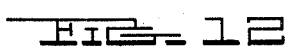
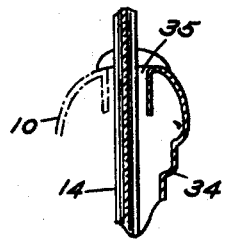
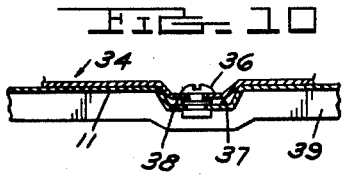
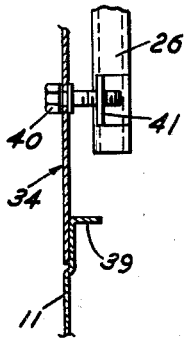
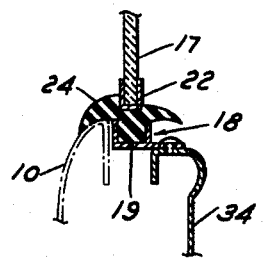
INVENTOR.
CARL C. FISH
BY
ATTORNEYS United States Patent Office 2,707,320
Patented May 3, 1955

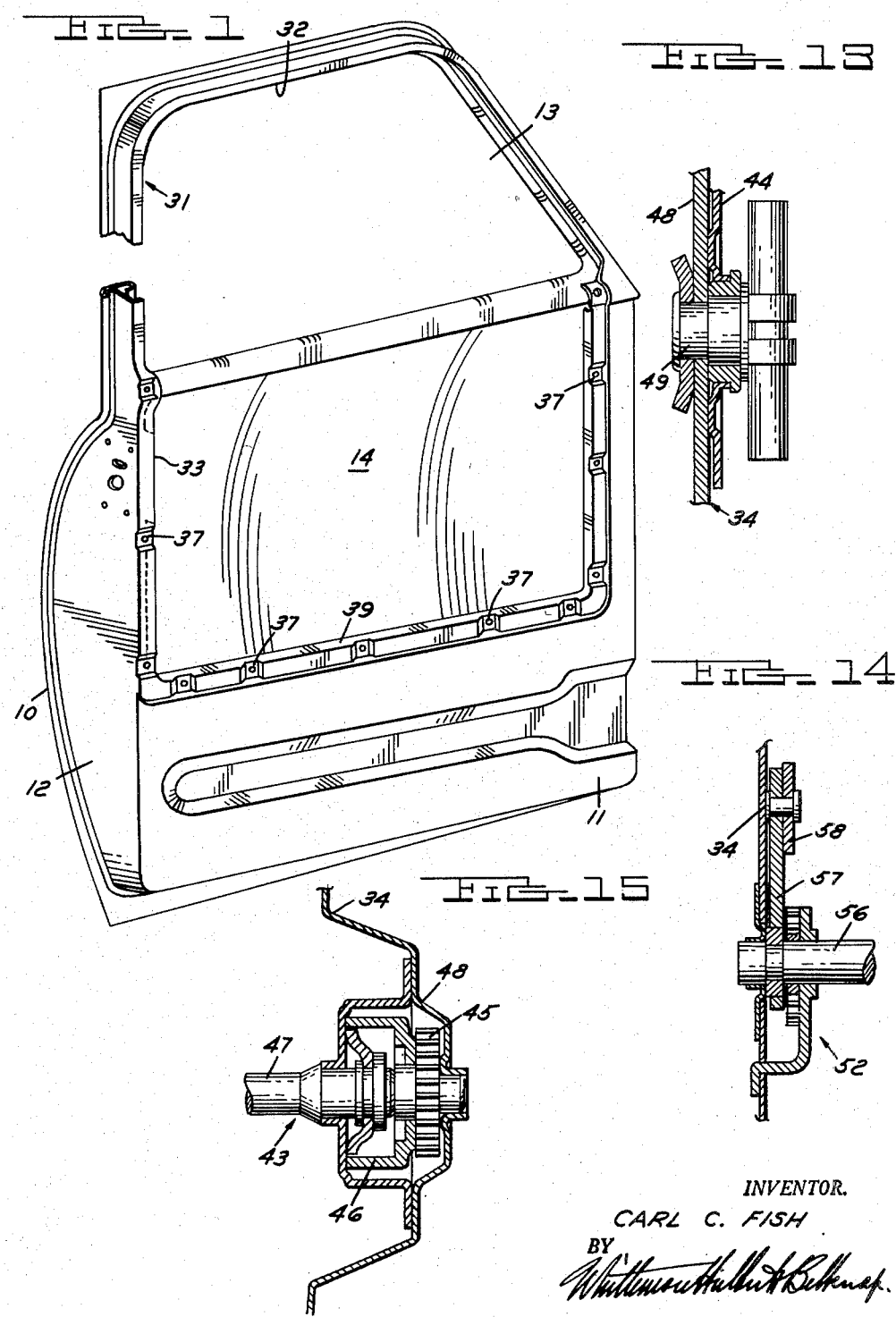

2,707,320

METHOD OF MAKING VEHICLE BODY DOORS

Carl C. Fish, Detroit, Mich., assignor to Ferro Stamping Company, Detroit, Mich., a corporation of Michigan Application June 25, 1951, Serial No. 233,277

4 Claims. (Cl. 29—152)

This invention relates to an improved method for use in the manufacture of vehicle body doors of the type having inner and outer panels secured together in lateral spaced relationship to provide a well below the usual window opening in the upper portion of the door for receiving a vertically slidable window panel.

In accordance with this invention the inner door panel is stamped or otherwise fashioned with an opening having a top portion registrable with the window opening in the door and having a bottom portion registrable with the window well in the door. The length of the opening formed in the inner door panel is greater than the width of the portion of the opening registering with the window well, so that the blank obtained from the inner door panel is suitable for use as a closure plate for the portion of the opening registering with the window well.

In practice the blank is trimmed along one side edge and is rotated throughout approximately 90°, so that the side and bottom edges of the blank respectively overlie the corresponding edges of the portion of the opening registering with the window well. The side and bottom edges of the resulting closure plate are fashioned to receive suitable fastener elements which serve to detachably secure the plate to the inner door panel.

It is still another object of this invention to support a number of the door accessories on the closure plate so that these accessories may be readily attached to the plate prior to assembling the latter on the inner door panel. Thus the plate and associated door accessories form a bench assembly capable of being produced at any desired location and later installed as a unit on the door structure.

The foregoing as well as other objects will be made more apparent as this description proceeds, especially when considered in connection with the accompanying drawings, wherein:

Figure 1 is a perspective view of a door structure of the type to which the present invention pertains, and showing the accessory mounting plate removed for the sake of clearness;

Figure 2 is an elevational view of the inner side of the door and showing the mount plate in assembled relationship with the inner door panel;

Figure 3 is a perspective view of the mounting plate showing the various accessories of the door assembled therewith;

Figure 4 is an elevational view of the inner side of the inner door panel prior to forming the opening therein;

Figure 5 is a view similar to Figure 4 showing the inner door panel after the opening is formed therein, and indicating the blank in broken lines;

Figures 6 to 10 inclusive are respectively sectional views taken on the lines 6—6, 7—7, 8—8, 9—9 and 10—10 of Figure 2;

Figure 11 is a sectional view taken on the line 11—11 of Figure 3;

Figure 12 is a sectional view taken on the line 12—12 of Figure 3;

Figures 13, 14 and 15 are respectively sectional views taken on the lines 13—13, 14—14 and 15—15 of Figure 2.

The door structure selected herein for the purpose of the present invention comprises an outer panel 10, an inner panel 11 spaced laterally from the outer panel, and secured to the latter by a flange 12. The flange 12 is turned laterally from the outer edge of the inner panel, and is welded or otherwise secured to the outer panel. The panels are suitably fashioned to provide a window opening 13 in the upper portion of the door and the space between the panels directly below the window opening 13 provides a well 14.

The window opening 13 is normally closed by a window assembly 15, which in the present instance, is of the ventilator type having a vertically slidable glass panel 16, and a pivoted glass panel 17. In accordance with the conventional practice, the pivoted glass panel 17 is supported in the front portion of the window opening 13 and the panel 16 occupies the space in the window opening 13 at the rear of the pivoted panel 17. As shown in Figure 3 of the drawings, the pivoted panel 17 is mounted in a frame 18 having a bottom bar 19 which is curved upwardly and rearwardly at the front end to respectively form the front bar 20 and the top bar 21 of the frame 18. The bottom, front and top marginal edges of the ventilator panel 17 are engaged by a glass retaining channel 22. The glass retaining channel 22 is pivotally connected to the frame 18 in a manner not shown herein to permit swinging movement of the ventilator panel 17 about a substantially vertical axis indicated in Figure 3 by the numeral 23. In conformity with orthodox practice the axis 23 is located between the front and rear edges of the panel 17 so that the front portion of the panel swings inwardly with respect to the frame 18, and the rear portion of the panel 17 swings outwardly. Suitable weather-stripping 24 is secured to the frame 18 to provide a weather-tight joint between the ventilator panel 17 and frame 18 in the closed position of the ventilator panel.

The rear side of the ventilator frame 18 is closed by a division bar 25 having a rearwardly opening channel for slidably receiving the front edge of the glass panel 16, and having an extension 26 which projects for a substantial distance below the bottom bar 19 of the frame 18. The division bar 25 forms a vertical guide for the front edge of the glass panel 16, and the rear edge of the latter is slidably engaged in a forwardly opening channel-shaped guide 27. The guide 27 comprises a bottom vertically extending section 28 and a top section 29. The top section 29 forms a continuation of the section 28; and if desired, may be extended forwardly as at 30 to receive the top edge of the glass panel 16 when the latter is in its closed position. The front end of the portion 30 is secured to the upper end of the guide 25 in alignment with the top bar 21 of the frame 18, and assists in strengthening the window assembly.

When the window assembly briefly described above is installed on the door structure, the extension 26 on the guide bar 25 and the bottom section of the guide 27 extend into the well 14. Thus the extension 26 and the section 28 of the guide 27 cooperate to hold the glass panel 16 in position within the well 14 when the panel 16 is lowered from the window opening 13.

As shown in Figures 1 and 2 of the drawings, the inner panel 11 of the door has an opening 31 formed therein in a manner to be presently described. The upper portion 32 of the opening 31 registers with the window opening 13 in the door, and the lower portion 33 of the opening 31 registers with the window well 14 in the door. Thus the portion 33 of the opening 31 forms a continuation of the top portion 32 of the opening 31, and opens into the interior of the window well 14. The portion 33 of the opening 31 is closed by a removable plate 34 having the top edge positioned to extend along the bottom of the window opening 13 and fashioned to cooperate with the adjacent portion of the outer panel 10 to form a slot 35 of sufficient width to receive the vertically slidable glass panel 16.

The bottom and opposite side edges of the plate 34 overlie the inner panel 11 and are detachably secured to the latter by fastener elements 36. As shown in Figures 3, 6 and 10 of the drawings, the inner panel is embossed laterally outwardly at spaced points along the bottom and side edges of the portion of the opening 31 to provide sockets 37 for receiving embossed projections 38 formed on the adjacent marginal edges of the plate 34. Thus the plate 34 may be readily positioned on the inner panel 11 of the door. The fastener elements 36 extend through the embossed portions 37 and 38 respectively of the inner panel 11 and closure plate 34. The heads of the fastener elements 36 are located within the recesses formed by the embossed portions 38 in the mounting plate 34, and do not project beyond the plane of the inner door panel. Referring now to Figures 6 to 9 inclusive, it will be noted that the inner door panel 11 is turned laterally outwardly at the marginal edges of the bottom portion 33 of the opening 31 to provide stiffening flanges 39.

In the present instance the door accessories, including the window assembly 15, are mounted on the plate 34 in the manner shown and described in detail in the Fish et al. application Serial No. 211,645, filed February 19, 1951, now Patent No. 2,658,790, dated November 10, 1953. Briefly the guide 25 of the window assembly 15 is secured to the plate 34 at the outer side of the latter by a fastener element 40. As shown in Figure 9 of the drawings, the fastener element 40 is in the form of a stud rotatably supported on the plate 34 and threadably engageable with a bracket 41 secured to the lower end of the extension 26 on the guide 25. The bottom section 28 of the guide 27 is secured to the plate 34 at the inner side of the latter by angle brackets 42. The angle brackets 42 have portions welded or otherwise secured to the inner side of the plate 34, and have outwardly extending portions welded or otherwise secured to the guide section 28 at vertically spaced points. Also the bottom bar 19 of the ventilator frame 18 may be secured to the adjacent top edge portion of the plate 34 in the manner shown in Figure 12. It follows from the above that the window assembly 15 is rigidly mounted on the closure plate 34 and may be installed on the door as a unit with the plate 34.

The window panel 16 is operated by suitable regulator mechanism designated in Figures 2 and 15 of the drawings by the reference character 43. The window regulator mechanism 43 may be any one of a number of types available to the trade, and is supported on the plate 34 at the outer side of the latter. Briefly the window regulator mechanism comprises a gear segment 44, a pinion 45 meshing with the gear segment and suitable clutch means 46 connecting the pinion 45 to an operating shaft 47. It will be noted from Figure 15 that the plate 34 is embossed laterally outwardly as at 48 and that the pinion 45, together with the clutch 46, is housed within the recess formed by the embossed portion 48. This embossed portion preferably extends for substantially the full width of the plate 34 in order to also reinforce the plate. In any case the operating shaft 47 projects beyond the inner face of the plate 34, and is adapted to support a suitable handle, not shown.

The gear segment 44 is pivoted on the outer side of the embossed portion 48 of the plate 34 by a pin 49 and is connected to the bottom of the vertically slidable glass panel 16 by an arm 50. The arrangement is such that rotation of the shaft 47 in opposite directions raises and lowers the glass panel 16 relative to the window opening 13.

If desired a door latch assembly 51 diagrammatically indicated in Figure 3 of the drawings may also be secured to the plate 34. The latch assembly 51 may be of any suitable type capable of being operated from either the inside or outside of the door. The inside operating mechanism for the latch comprises a remote control device 52 shown in Figures 2, 3 and 14 of the drawings as mounted on the plate 34 within a recess 53 formed by a second outwardly embossed part 55 of the plate. The remote control device 52 has a shaft 56 which extends inwardly with respect to the plate 34 and is connected to an arm 57. The arm 57 is in turn connected to the front end of a link 58 which extends along the recess 53 and projects outwardly through an opening 59 in the plate 34. The rear end of the link 58 is suitably connected to the latch assembly 51 for operating the latter in response to rotation of the shaft 56.

It follows from the foregoing that the window assembly 15, window regulator mechanism 43, latch assembly 51 and the remote control 52 are all supported on the plate 34 in a manner to be installed on the door as a unit with the plate 34.

In accordance with the present invention, the opening 31 formed in the inner door panel 11 is of a dimension to permit the plate 34 to be formed from the blank resulting from forming the opening 31. In Figure 4 of the drawings the numeral 60 designates a sheet of stock fashioned to the general contour of the inner panel and illustrating the latter prior to stamping or otherwise forming the opening 31 therein. The broken line 61 in Figure 4 of the drawings indicates the blank resulting from forming the opening 31. As shown in Figure 5 of the drawings the blank 61 is rotated 90° in a counterclockwise direction from the position thereof shown in Figure 4, and it will be seen that the blank 61 is of sufficient dimension to enable producing the plate 34 therefrom.

The broken line 62 in Figure 5 of the drawings indicates the line along which the blank 61 is trimmed to produce a blank of sufficient size to form the plate 34. After the trimming operation, the resulting blank is subjected to the required stamping operations to form the plate 34 previously described. As stated above the plate 34 is removably secured to the inner panel 11 to close the lower portion 33 of the opening 31, and to also form a support for a number of the accessories of the door structure. Thus final assembly of the door structure is not only greatly simplified by mounting the various door accessories on the plate 34, but in addition, waste metal is reduced to a minimum by making the plate 34 from the blank resulting from forming the opening 31 in the inner door panel.

What I claim as my invention is:

1. In a method of forming a vehicle body door comprising an outer panel having an opening in the upper portion, an inner panel spaced laterally from the outer panel to provide a well below the opening in the outer panel and having a continuous uninterrupted opening of a length greater than its width, the top portion of the opening in the inner panel registering with the opening in the outer panel to provide a window opening for the door and the remaining bottom portion of the opening in the inner panel opening into the well, the steps of shaping a sheet of stock to form the inner door panel, removing a blank of stock from the sheet to form the aforesaid opening in the inner panel, rotating the blank so that it extends crosswise of the opening in said sheet, trimming the blank to provide a closure plate for the said remaining bottom portion of the opening in the inner panel with the upper edge of the plate shaped to define the lower boundary of the top portion of the opening in the inner panel, and attaching the plate to the inner panel to close said remaining bottom portion of the opening therein by securing the opposite side edges of the plate to the portions of the inner panel extending along the corresponding edges of the bottom portion of the opening therein.

2. The method as defined in claim 1 wherein the length of the blank removed is equal to the width of the plate, and the blank is trimmed along one side edge only.

3. In a method of forming a vehicle door body comprising an outer panel having an opening in the upper portion, an inner panel spaced laterally from the outer panel to provide a well below the opening in the outer panel and having a continuous uninterrupted opening of a length greater than its width, the top portion of the opening in the inner panel registering with the opening in the outer panel to provide a window opening for the door and the remaining bottom portion of the opening in the inner panel opening into the well, the steps of shaping a sheet of stock to form the inner door panel, removing a blank of stock from the sheet to form the aforesaid opening in the inner panel, rotating the blank so that it extends crosswise of the opening in said sheet, trimming the blank to provide a closure plate for the said remaining bottom portion of the opening in the inner panel, and attaching the plate to the inner panel to close said remaining bottom portion of the opening therein by securing the opposite side edges of the plate to the portions of the inner panel extending along the corresponding edges of the bottom portion of the opening therein.

4. The method as defined in claim 3 wherein the length of the blank removed is equal to the width of the plate, and the blank is trimmed along one side edge only.

References Cited in the file of this patent

UNITED STATES PATENTS

| | | |
|---|---|---|
| 2,176,192 | Widman | Oct. 17, 1939 |
| 2,243,464 | Kucher | May 27, 1941 |
| 2,284,697 | Trautvetter | June 2, 1942 |
| 2,348,145 | Perkins | May 2, 1944 |

FOREIGN PATENTS

| | | |
|---|---|---|
| 570,106 | Great Britain | June 22, 1945 |